United States Patent [19]

Urch

[11] Patent Number: 5,078,208
[45] Date of Patent: Jan. 7, 1992

[54] ISOLATING HEAT EXCHANGER

[76] Inventor: John F. Urch, 35 Tintern Road, Ashfield, New South Wales 2046, Australia

[21] Appl. No.: 505,907

[22] Filed: Apr. 5, 1990

[30] Foreign Application Priority Data

Apr. 19, 1989 [AU] Australia .................. PJ3775

[51] Int. Cl.$^5$ .............................................. F28F 3/00
[52] U.S. Cl. .................................. 165/166; 165/167; 165/54; 165/66; 62/305
[58] Field of Search .................. 165/54, 166, 167, 165, 165/164, 66; 62/305

[56] References Cited

U.S. PATENT DOCUMENTS

| 326,839 | 9/1885 | Braithwaite et al. | 165/166 |
|---|---|---|---|
| 1,409,520 | 3/1922 | Bird | 165/166 |
| 1,548,159 | 8/1925 | Murray | 165/166 |
| 3,047,271 | 7/1962 | Burtt et al. | 165/166 |
| 3,659,646 | 5/1972 | Hurko et al. | 165/164 |
| 4,043,388 | 8/1977 | Zebuhr | 165/166 |
| 4,131,159 | 12/1978 | Long | 165/166 |
| 4,141,412 | 2/1979 | Culbertson | 165/166 |
| 4,258,784 | 3/1981 | Perry et al. | 165/166 |
| 4,343,355 | 8/1982 | Goloff et al. | 165/166 |
| 4,616,695 | 10/1986 | Takahashi et al. | 165/54 |

FOREIGN PATENT DOCUMENTS

| 1183834 | 3/1985 | Canada | 165/166 |
|---|---|---|---|
| 2826343 | 1/1979 | Fed. Rep. of Germany | 165/54 |
| 3327685 | 2/1985 | Fed. Rep. of Germany | 165/54 |
| 0207734 | 12/1982 | Japan | 165/54 |
| 1272088 | 11/1986 | U.S.S.R. | |
| 2189589 | 10/1987 | United Kingdom | 165/166 |
| WO8403353 | 8/1984 | World Int. Prop. O. | 165/54 |

*Primary Examiner*—John Ford
*Attorney, Agent, or Firm*—Dellett, Smith-Hill and Bedell

[57] ABSTRACT

A heat exchanger is constructed from a heat-conductive metal foil wound backwards and forwards in sinuous fashion to provide a stack of parallel pockets (1) between neighboring sections (8) of the foil. The pockets (1) contain baffles (5,6) which guide fluid flowing through the pockets to follow a serpentine path of U, S or M shape. The serpentine path in all the pockets is substantially the same shape but the direction of fluid flow (13) in alternate pockets is opposite to the flow direction (14) in the remaining pockets. Two corner regions of the pocket stack are each provided with two manifolds (15,16) one of which communicates with the alternate pockets (1) and the other manifold communicates with the remaining pockets (16). The pockets may be formed from a signal foil or from two or more foils. The manifolds may be arranged on diagonally opposite, or on adjacent corner regions of the stack.

5 Claims, 5 Drawing Sheets

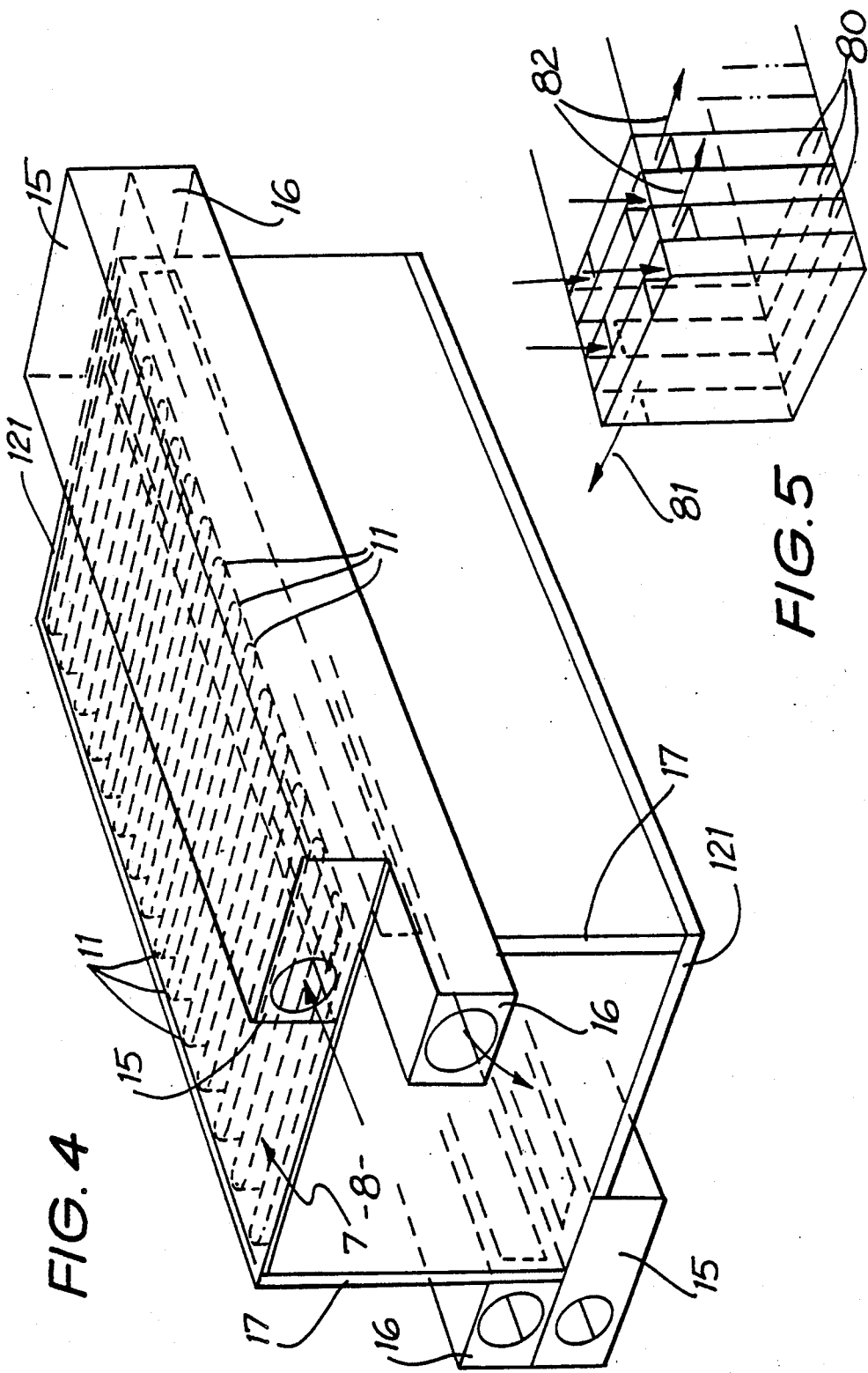

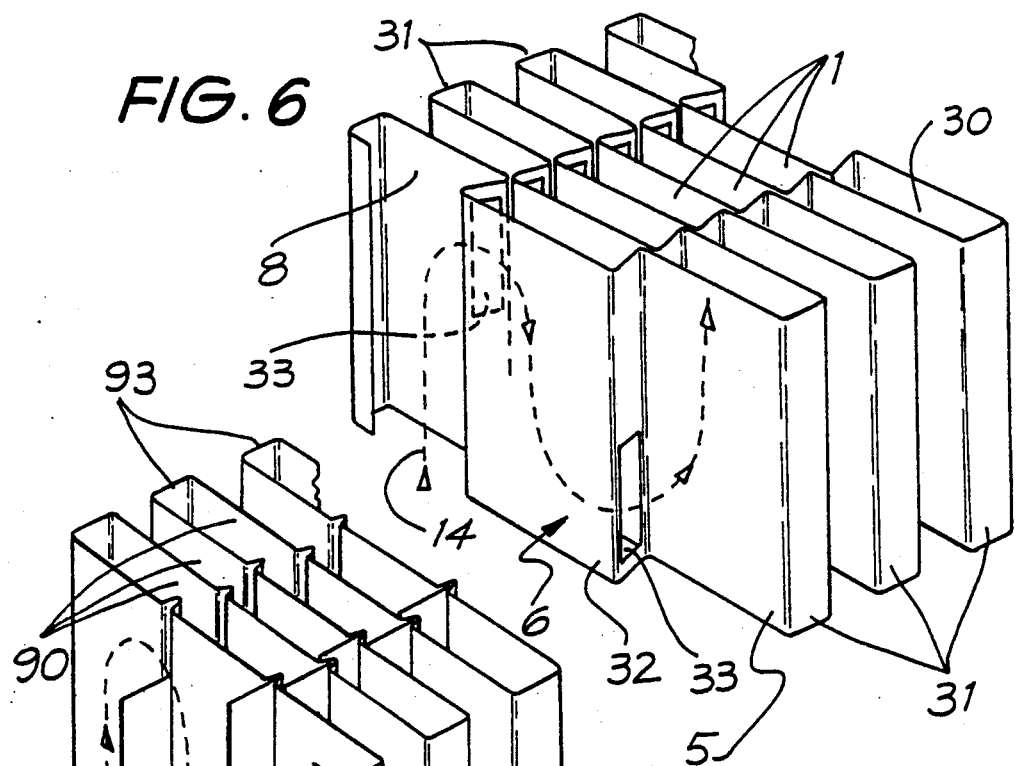
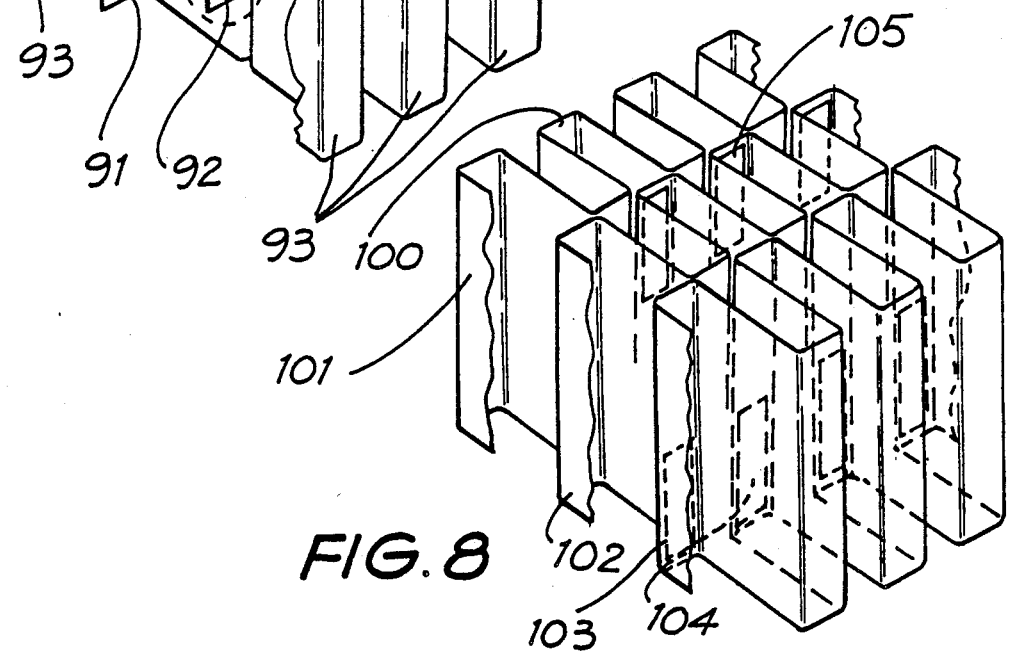

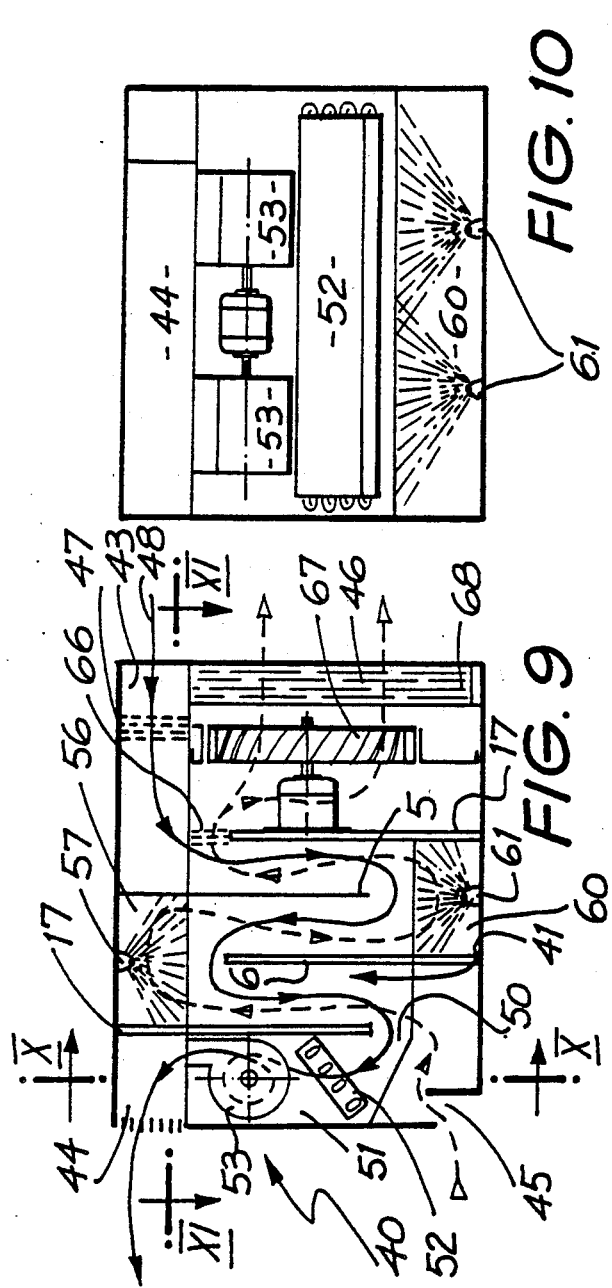
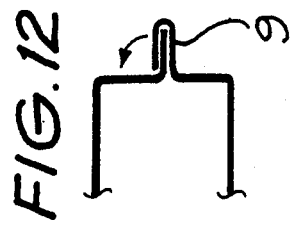
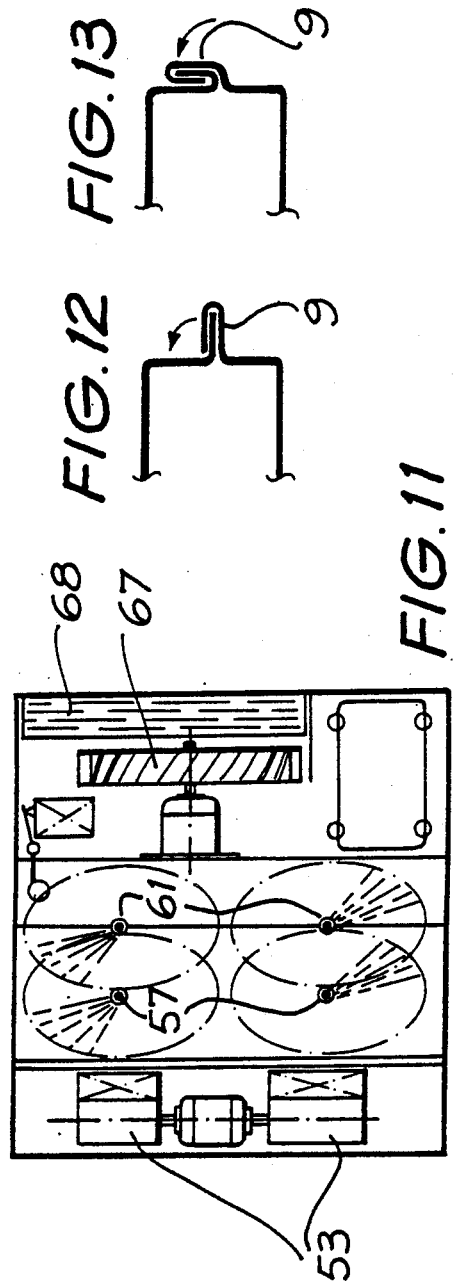

ISOLATING HEAT EXCHANGER

FIELD OF THE INVENTION

This invention relates to an isolating heat exchanger and is more specifically concerned with providing a heat exchanger of high efficiency and capable of being manufactured on a mass-production basis. The expression "isolating heat exchanger" is used to denote one having separate flow paths between which heat transfer is to take place, even though some leakage of the fluids between the passages may take place.

STATE OF THE ART

Heat exchangers for transferring heat between two fluids are well known. Either or both fluids may be liquid or gaseous. Ideally a heat exchanger has a thermal efficiency of 100%. This is obtainable only by arranging the flow of the primary and secondary fluids between which heat is to be transferred, in true counter flow with respect to one another. Design problems are however encountered in arranging this because no satisfactory way has been devised for providing, on a mass-production basis, fluid flow passages of compact form in a heat exchanger using a thin sheet or foil between the primary and secondary fluids. The foil should keep the two fluids separate while flowing along counterflow paths, and should have good heat transfer properties to allow efficient heat transfer between the two fluids.

Examples of prior art attempts to provide satisfactory heat exchangers without using true counterflow principles, are shown in U.S. Pat. Nos. 4,141,412 and 4,616,695.

U.S. Pat. No. 4,141,412 instructs the use of a stack of superimposed parallel-flow heat exchange passages by arranging spacers between a stack of parallel plates. The spaces define serpentine or folded fluid flow passages so that the length of the heat exchanger is not unduly long, but this results in a relatively costly construction as the spacers are fabricated separately from the sheets and these have to be held at correct positions in a stack. Also, such an arrangement is incapable of providing a thermal efficiency approaching the ideal of 100%, which is theoretically obtainable when counterflow principles are employed.

U.S. Pat. No. 4,616,695 seeks to obtain a simply manufactured construction of heat exchanger by using a corrugated foil between two plates, and relies on crossflow principles, rather than counterflow principles, to achieve an acceptable heat transfer efficiency between the fluids flowing through neighboring passages. The corrugations of the foil provide two sets of parallel flow passages in which one of the fluids flows through one set and the other fluid flows through the second set. This construction results in a heat exchanger of greatly extended length which often cannot be tolerated. In the crossflow configurations described, the fluid has to flow laterally in at least one of the sets of passages with respect to the fluid flow in the other set of passages at one end thereof, in order to combine the streams from the different passages in a way which does not involve excessive manufacturing costs. Through being compelled to resort to crossflow principles, rather than counterflow, the maximum thermal efficiency of the heat exchanger falls from a theoretical 100% to a theoretical 75% or even as low as 50% according to the design of crossflow used. Column 2 of the specification, between lines 32 and 37, specifically draws the reader's attention to the fact that it "is considered impossible to realise the plate-fin type heat exchanger which is of perfect counterflow type and which is capable of industrialised mass-production". It is the solution of this problem which is the concern of the present applicant.

OBJECT OF THE INVENTION

An object of this invention is to provide an improved isolating heat exchanger.

THE INVENTION

In accordance with one aspect of this invention there is provided an isolating heat exchanger having a first set of parallel flow paths which alternate with a second set of parallel flow paths arranged in counter flow to the first set, an extended heat exchange surface separating the flow paths of the first set from those of the second set and formed from a foil of material having good heat-conducting properties and wound back and forth in a sinuous fashion to provide a stack of similar pockets of which alternate pockets open in one direction and contain the flow paths of the first set and the remaining pockets open in the opposite direction and contain the flow paths of the second set, first inlet and outlet manifolds communicating respectively with opposite ends of the other set of flow paths; in which heat exchanger the first inlet manifolds and the second outlet manifolds are disposed respectively at two adjacent sides defining one corner region of the stack, and the first outlet and the second inlet manifolds are disposed respectively at two adjacent sides defining a second corner region of the stack.

In accordance with a second aspect of the invention there is provided an isolating heat exchanger having a stack of parallel pockets containing baffles guiding flow of fluid through the pockets along a sinuous flow path containing parallel passes and each extending between a fluid inlet at one corner region of the stack and a fluid outlet at another corner region of the stack; the passes in neighboring pockets being parallel to one another and lying in a common plane and the fluid flow path through alternate pockets of the stack being substantially in counterflow to the fluid flow path through the remaining pockets of the stack; in which heat exchanger in each corner region of the stack has one of the adjacent stack sides formed with a line of fluid inlets communicating with alternate pockets of the stack, and the other adjacent stack side at the same corner region is formed with a line of fluid outlets communicating with the remaining pockets of the stack. For a small heat exchanger the stack of pockets are preferably formed between sections of a thin heat-conductive foil made, for example, from an alloy of copper and wound back and forth in sinuous fashion. However, larger heat exchangers may have their pockets formed between overlapping plates of a heat conductive material. The important feature of the invention is that the pocket inlets and outlets are arranged in two corner regions of the heat exchanger with the inlets alternating with the outlets in each corner region which has the inlets arranged in a line on one adjacent side of the corner region and the outlets arranged in a line on the other adjacent side of the corner region.

PREFERRED FEATURES OF THE INVENTION

Said two corner portions of the stack may be arranged diagonally opposite one another or they may be located at two adjacent corner portions. Their location depends on the number of passes made by the fluid within each pocket before emerging into the outlet manifold. Baffles may be provided inside the pockets to guide the fluid to flow around a sinuous path which contains two or more passes of the fluid between opposite ends of the pocket before it emerges into the outlet manifold. Preferably the baffles are provided inside the pockets by suitably shaped portions of the foil. Conveniently the foil is made from copper or a copper alloy, or from aluminum.

The pockets may be provided by a single foil, or by two or more foils of castellated shape and extending in the same general direction as one another with the castellations staggered.

INTRODUCTION TO THE DRAWINGS

The invention will now be described in more detail, by way of examples, with reference to the accompanying diagrammatic, partly broken away, and schematic drawings, in which:

IN THE DRAWINGS

FIG. 4 is a perspective view of a stack of pockets of a heat exchanger together with associated manifolds and blanking plates, the pockets being formed by winding a continuous and suitably cut foil of metal back and forth in sinuous fashion and arranging it with its return bends vertical;

FIG. 5 is a perspective view corresponding to FIG. 4 and used when each pocket has an internal flow path providing an even number of passes as shown in FIG. 1 or FIG. 3, the blanking plates and associated manifolds being omitted for the sake of clarity;

FIGS. 6 and 7 respectively show two ways of performing a continuous metal foil to provide triple pass flow paths through the pockets;

FIG. 8 shows, very diagrammatically, a stack of pockets having baffles and provided by three suitably shaped metallic foils extending parallel to one another so that each pocket is formed by respective sections of the three foils;

FIG. 9 is a vertical section through an air-conditioning unit incorporating a heat exchanger providing triple-pass gas flow paths through its pockets;

FIGS. 10 and 11 are respectively sections through FIG. 9 taken on the lines and in the directions indicated by the arrows X—X and XI—XI respectively; and, FIGS. 12 and 13 show respective stages in the formation of a lock joint between overlapping edge strips disposed at sides of the pockets shown in FIG. 4.

DESCRIPTION OF PREFERRED EMBODIMENT

The preferred embodiment is described with reference to FIGS. 2,4,6,12 and 13 of the accompanying drawings. Throughout the embodiments the fluid used is gaseous, e.g. air. FIGS. 9,10 and 11 show the use of a slightly modified form of heat exchange stack of pockets to that shown in FIG. 6.

Figure 2:
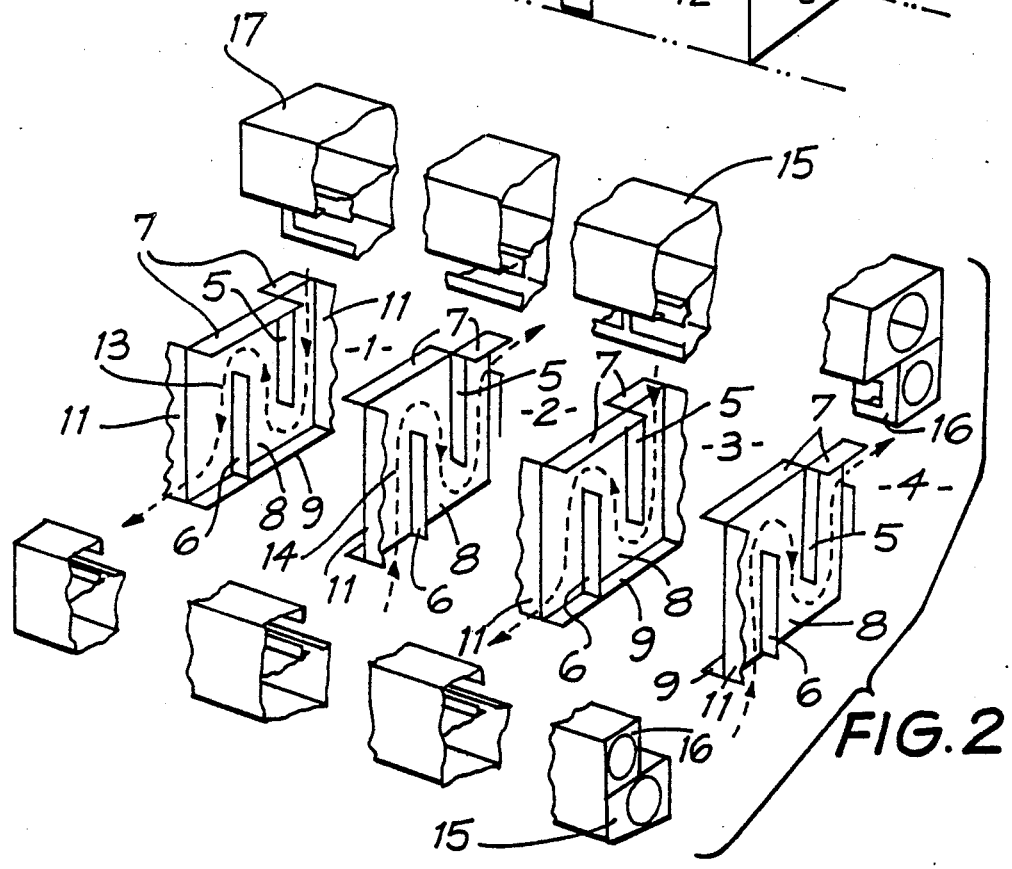
FIG. 2 is a view corresponding to FIG. 1 but showing a triple pass flow path produced in each pocket by two parallel baffles.

FIG. 2 shows, in exploded form, four pockets 1,2,3 and 4 at one end of a stack of pockets of a heat exchanger shown more fully in FIG. 4. Returning to FIG. 2, the pockets are of square shape and each is provided with two baffles 5 and 6 integrally formed from a continuous metal foil 7 wound in sinuous fashion and provided at opposite sides with vertical, channel-shaped return bends 11 and square sections 8 providing partitions separating the pockets from one another. The baffles 5 and 6 are parallel and vertical and the baffle 5 terminates short of the lower edge of the foil whereas the baffle 6 terminates short of the upper edge of the foil.

The undersides of alternate pockets are closed by locked-together edge strips 9 bent out of the plane of the section 8. The joint used to lock the strips 9 together is shown in detail in FIGS. 12 and 13 which show the strips in end elevation. The joint is formed by forming the free edge portion of one of the strips 9 into a cranked configuration to provide a terminal tongue, and forming the free edge-portion of the other strip with a longitudinally-extending channel into which the tongue fits as shown. The overlapping tongue and channel are then rolled flat as shown in FIG. 13 to complete the lock joint.

Returning to FIG. 2, the baffles 5,6 extend from one face of each partition and abut the opposed face of the adjacent partition to serve as a spacer between them as well as a baffle. The air flow through the pocket is guided by the baffles 5 and 6 to follow a triple pass S-shape as shown by the arrows 13 and 14. As is apparent from the arrows a true counterflow of air occurs in adjacent pockets of the strip when blanking plates 17 and 121, shown in FIG. 4, are fitted to the sides of the heat exchanger stack.

The top sides of alternate pockets are partially closed by overlapping edge strips 7 which are again held together by lock joints of the type described with reference to FIGS. 12 and 13. The top side of each partition 8 is provided with an upward extension from which the edge strip 7 is formed, and the edge strips 7 are each slit perpendicularly to its length to provide a long portion about twice the length of the short portion of the edge strip. The two portions are respectively bent in opposite directions to the end of the partition 8 and are so arranged that the longer portions oppose one another and are joined across the ends of alternate pockets by lock joints as described. The shorter edge portions are likewise joined by lock joints and span across the tops of the pockets. The result is a stack of pockets held apart by the baffles 5 and 6 and held together by the attachment of the edge strip portions of neighboring pockets.

As is apparent from FIG. 4, diagonally opposite corner portions of the stack of pockets each have two associated manifold blocks 15 and 16. The manifold block 15 with an associated side plate 121 covers the top face of the stack and extends beyond one edge as shown. It communicates with the upwardly-opening ends of the gas flow paths 13 in the pockets to admit air to them. The manifold block 16 has an associated side plate 17 covering an adjacent side of the stack, and communicates with the sideways opening orifices through which air from the neighboring pockets in the stack is discharged from the flow paths 14 shown in FIG. 2. A similar arrangement of manifold blocks 15 and 16 and associated side plates 17 and 121 are associated with the diagonally opposite corner of the stack of pockets as is illustrated in FIG. 4.

It is apparent from FIGS. 2 and 4 that the spaces left between the shorter strip portions which are directed away from one another, provide a line of orifices through which the overlying manifold 15 can communicate with the alternate pockets of the stack.

Each of the manifold blocks is provided at one end with either an entry or an exit opening as shown.

As the separation of the gas flow paths 13 and 14 relies, to some extent, on abutment seals between the edges of the foil and metal surfaces of the manifold blocks 15 and 16 and the blanking sheets 17 and 121, the air in both flow paths is preferably at about the same atmospheric pressure. Although the heat exchanger is designed for use with gases, it can also be used with liquids if desired. Also, by making the seals pressure-resistant and impervious, fluids at different pressures can be used with the heat exchanger. Where seals are required to be effective, for example between the blanking sheets or plates, the manifold blocks and the stack of pockets, a thin foam plastics gasket (not shown) of suitable shape is conveniently interposed between the side faces of the stack and the manifold or blanking sheet.

FIG. 6 shows how a continuous length of parallel-sided foil may be shaped to provide the baffles 5 and 6 in the pockets of the stack. The metal foil, preferably copper, is referenced 30 and has its return bends 31 formed of channel shape. The sheet sections between the return bends is formed with an upright deformation 32 of trapezoidal cross section. The shorter parallel side of the trapezium lies in the plane of the section 8 and the longer parallel wall lies in an offset parallel plane. The non-parallel walls each have a rectangular slot 33 cut in them and which is formed in the foil before it is bent into the sinuous formation shown. As is apparent, the sections 8 can be compressed against one another so that the longer parallel walls of the trapezoidal formations 32 close the trapezium-shaped cavity of the neighboring formations 32. The unslotted portions of the non-parallel walls of the formations 32 provide the baffles 5 and 6, and the gas flow path 14 through the pocket 1 passes through the two slots 33 to follow its triple-pass path through the pocket 1, as shown.

FIGS. 9, 10 and 11 show how the heat exchanger described can be incorporated into an air conditioner unit referenced 40. It has a heat exchanger 41 through which air travels in counterflow between a fresh air inlet manifold chamber 43 and a fresh air outlet grill 44 which discharges into a room. Stale air from the room is withdrawn via a lower inlet 45 and discharged into the outside air through an outlet 46. The path followed by the stale air is shown by a broken arrow and the path followed by the fresh air is shown by a continuous arrow. The return bends of the foil used to make the stack are vertically arranged adjacent the gas inlet and outlet ends of the heat exchanger, respectively. That is to say to the left-hand end and to the right-hand end of the stack 41 shown in the figure. The strip portions 9 disposed at the lower side of the stack in FIG. 2, are disposed at the top of the stack in FIG. 9 and extend from left to right of the figure. They thus cover the tops of the pockets through which fresh air is flowing from right to left of the figure and following the path denoted by the solid arrow.

The fresh air is drawn from the inlet manifold chamber 43 where it passes through a removable and cleanable filter 47. It then passes vertically downwards into the upper end of the heat exchanger 41 at 48, i.e. adjacent the right-hand end of vertical return bends 11. The air follows a triple-pass path through the heat exchanger, being guided by the vertical baffles 5 and 6, and leaves by a lower opening 50 formed between the blanking plate 17 and flanked by two of the vertical return bends 11 on the left-hand side of the stack. The opening 50 leads into a manifold chamber 51 containing an evaporator 52 and a blower 53 which sucks the fresh air along the path indicated by the solid arrow, and discharges it through the grill 44 and into the room to be cooled.

Warm, stale air from the room is drawn through the lower inlet manifold 45 and flows vertically upwards into the heat exchanger stack at its left-hand end. The stale air then travels along the path shown by the broken arrow and, as shown, it executes vertical passes which are in counterflow to the vertical passes executed by the fresh air following the full arrow flow path in the two flanking pockets of the stack. The top ends of the pockets 1 of the heat exchanger through which the stale air is circulated, have their first two passes opening upwardly into a plenum 56 providing a gas-turning space and containing an atomising or swirl spray 57 which discharges fine droplets of water, of about five microns diameter, into the stale air. These droplets evaporate to absorb latent heat of evaporation from the stale air and thereby cool it. Some of the water droplets also deposit onto the surfaces of the heat exchanger in contact with the stale air in the first and second passes. A similar plenum chamber 60 providing a second turning space, is located beneath the heat exchanger 41 and contains upwardly directed water atomizing or swirl jets 61. The undersides of the heat exchanger pockets 1 at the lower ends of the second and third passes of the stale air flow path, open downwardly into the lower plenum chamber 60 which collects the water precipitated from the sprays. A pump (not shown) provides water to the sprays 56 and 61 from the water collected in the plenum chamber 60 and any make-up water found to be necessary.

The stale air discharges from the heat exchanger through outlets 66 formed in the upper ends of the right-hand return bends 11, and flows through an outlet 66 under the action of a motor-driven suction fan 67. This blows the stale air through a condenser 68 forming part of a refrigeration circuit supplying the evaporator 52 with cooled refrigerant which is expanded in it to cool the fresh air entering the room in a manner well-known in the art.

It will be noted that in this embodiment of heat exchanger the baffles 5 and 6 guiding the stale air along the broken arrow flow path extend from top to bottom of the stack, and are aligned vertically with vertical end walls of the plenum chambers 56 and 60. The pockets of the stale air gas flow path are open at their tops and bottoms, this being achieved by the edge strips 9 and the longer portions of the edge strips 7 of FIG. 2, extending in the opposite directions to those shown in that figure. Thus they close the upper and lower sides of the pockets through which the fresh air is travelling.

OPERATION OF THE PREFERRED EMBODIMENT

The temperature at which fresh air is to enter the room is thermostatically controlled and determines the setting of the evaporator 52. This receives fresh air which has already been cooled by its passage through the heat exchanger 41 and is to be dishcarged into the room. It is assumed that it is drawn in from outside air at a temperature above that required in the room. The stale air thus cools the fresh air in the heat exchanger 41, and this cooling is enhanced by the evaporation of the water droplets entrained in the stale air.

MODIFICATIONS OF THE PREFERRED EMBODIMENT

The embodiment of FIGS. 9, 10 and 11 may be modified by removing the sprays 56 and 61 and the associated pumping equipment. The top and bottom plenum chambers 56 and 60 may also be removed and the upper and lower sides of the heat exchanger formerly covered by them, blanked off. This makes a more compact unit although the advantage of water spray cooling is lost.

The refrigeration circuit containing the evaporator 52 and condenser 68 may also be removed so that cooling of the incoming fresh air is achieved solely by the stale air discharged from the room and by the water sprays 57 and 61. Finally because the heat exchanger itself is capable of achieveing 90% thermal efficiency, both the water sprays and the refrigeration circuit can be removed so that the fresh air is cooled only by the stale air flowing out of the room.

The baffles 5 and 6 used in the embodiment of stack shown in FIG. 9 to 11, are preferably constructed as is described below with reference to FIG. 7.

Figure 1:
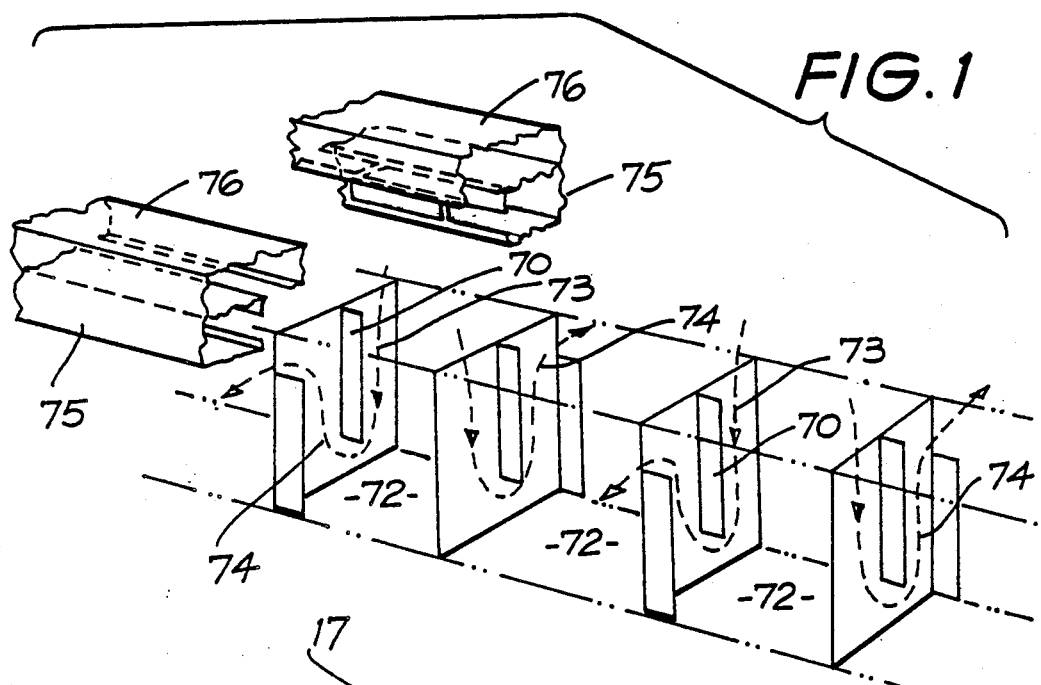
FIG. 1 is an exploded and broken away perspective view of four pockets of an isolating heat exchanger and parts of its associated manifold blocks, each pocket having a baffle providing a double pass flow passage through it.
Figure 3:
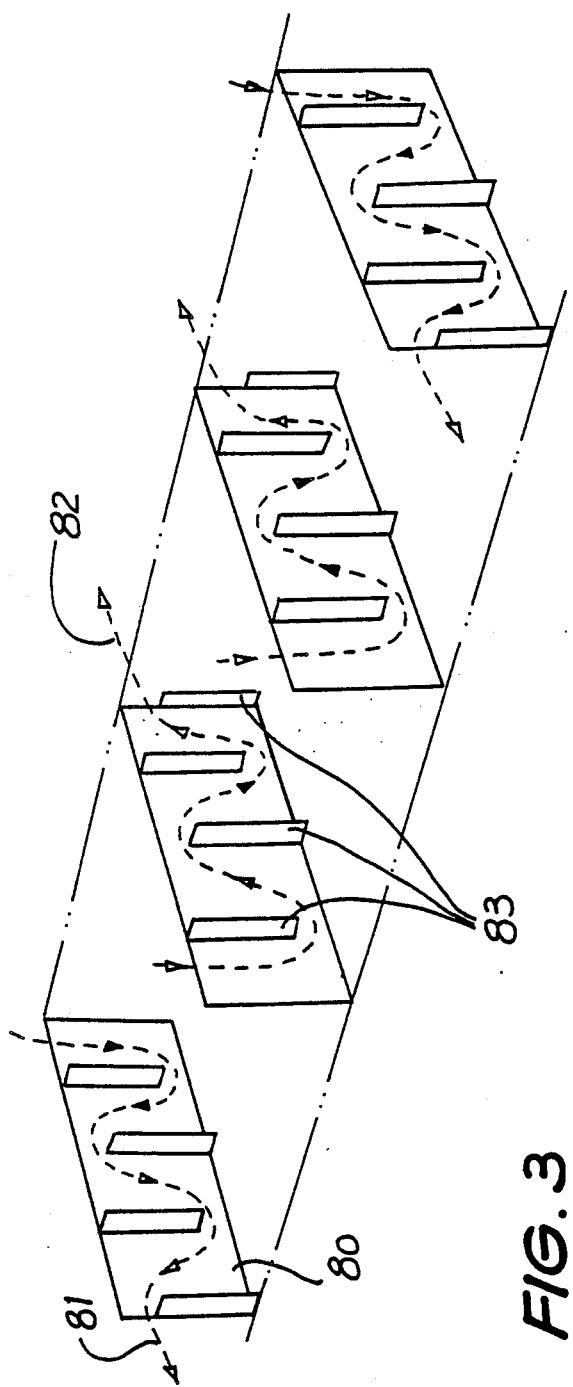
FIG. 3 is a view corresponding to FIG. 2 but showing the disposition of baffles necessary to provide a quadrupal pass through each pocket, the manifolds being omitted from FIG. 3 but occupying the positions shown in FIG. 1.

FIGS. 1 and 3 show alternative paths which can be used with the heat exchanger. In FIG. 1 the pockets each have a single baffle 70 integrally formed with the sinuously wound metal foil. Each pocket 72 then contains a double-pass fluid flow path, the pass in one direction being referenced 73 and alternating with the most identical flow path 74. The heat exchanger is again equipped with corner manifolds, here referenced 75 and 76 arranged in two pairs and one of which acts as a collector and the other as a supplier of air for the flow paths through the heat exchanger. In this case, however, the manifolds are arranged on adjacent, instead of diagnoally opposite corner regions of the heat exchanger stack.

In the embodiment of FIG. 3, quadruple-pass gas flow paths are provided in each pocket. These paths are obtained by using three parallel baffles 83 in each pocket. The gas flow paths 81 and 82 are again in almost complete counterflow, the only zone where pure counterflow does not occur is in the immediate vicinity of the manifolds.

FIG. 5 shows the arrangement of the inlets and outlets to the flow paths 81 and 82 of FIG. 3. This arrangment require the manifolds (not shown) to be located at adjacent corner regions of the pocket stack.

FIG. 7 shows an alternative way of forming the metal foil to provide a stack of parallel pockets 90 each containing two parallel baffles 91 and 92. The foil is wound in sinuous fashion and is provided between the return bends 93 with two spaced and parallel baffles 91 and 92. Each baffle is formed by first creasing the foil to provide an upright pinched wall. A separate metal strip 92 is fitted into the pinch of the foil so that the bulk of its width protrudes beyond the pinch. The protruding portion of the strip 92 provides a baffle, and the portion of the pocket beyond the end of the baffle provides a space through which the flow of air through the pocket follows a return bend between two parallel passes. The positions of the two creases in which the baffle strips are mounted, are slightly staggered, so that the baffles of two neighboring pockets do not lie in the same plane.

FIG. 8 shows an arrangement in which the stack of pockets 100 are formed from three longitudinally-extending castellated foils parts of each of which forms each of the pockets. The three foils are referenced 101, 102 and 103. One outer foil 101 is imperforate, while the centre castellated foil 102 and the other outer foil 103 are each formed with respective rows of side windows 105, 104. The centre foil 102 has its castellations arranged between those of the other two foils but staggered with respect to them. The perforated sections of the castellations provide baffles in a triple pass flow path through the pocket, as shown in FIG. 2. A similar construction of pockets can be provided by using only two castellated foils arranged side-by-side and having their castellations staggered. This will provide a double-pass flow path. Such an arrangement is not illustrated.

In one example of a heat exchanger made in accordance with the invention, the pockets were 300 mm. square and spaced 6 mm. apart. Seventy five pockets were provided in the stack to give a heat exchange area of 7 metres. Air, at normal atmospheric pressure and temperature, was passed through both sets of parallel flow paths provided by the pockets, at a rate of 425 cubic metres per hour. The ratio of air quantity to unit area of heat exchange surface was approximately 60 cubic meters per hour per square meter of heat exchange surface. A temperature exchange efficieny of 90% was achieved. This is a greatly superior performance to that achieved with the construction of heat exchanger of U.S. Pat. No. 4,616,695 which claims only 75%.

Foil thicknesses of 0.05 mm. to 0.01 mm. have been found to be adequate for carrying out the invention.

In a further embodiment of the heat exchanger not illustrated but similar in general appearance to that shown in FIG. 4, the foil is replaced by a stack of similar separate rectangular plates which define the pockets between them. Spacers, which may be combined with baffles, hold the plates in spaced parallel relationship. The stack of plates is closed at its sides by combinations of blanking plates, such as those referenced 17 and 121 in FIG. 4, and pairs of manifolds arranged at corner regions of the stack as shown in FIG. 4 at 15 and 16. Alternate pockets formed between the plates carry fluid flowing along a serpentine flow path in one direction between an inlet manifold and an outlet manifold, and the remaining pockets contain serpentine fluid flow paths which are in counterflow to the flow path associated with the alternate pockets, as has already been described with reference to FIGS. 1, 2 and 3. The plates are naturally made of a good heat-conductive material and may have the baffles formed integrally with them or separately from them. As has already been mentioned, the corner regions occupied by the manifolds may be adjacent or diagonally opposite one another.

I claim:
1. An isolating heat exchanger comprising:
a plurality of spaced parallel thermally conductive partitions disposed in a stack having at least first and second corner regions, first and second opposite sides and thrid and fourth opposite sides, each two adjacent partitions defining a pocket therebetween, the pockets being in first and second sets such that alternate pockets are in the first and second sets respectively, and wherein each partition has a first marginal strip extension integral there- with at the first side of the stack, the first strip extensions of alternate partitions successively extend in opposite directions along the first side of the stack to provide opposed strip extensions which are joined to one another to close the pockets of the first set at said first side, and each partition has a second marginal strip extension integral therewith at the second side of the stack, the second strip extensions being slit transversely of their lengths to provide shorter and longer portions to each such second strip extension, the longer portion extending in the same direction along the stack as the first strip extension of the partition and said shorter portion extending along the stack in the opposite direction from said longer portion and being arranged in opposed pairs, the opposed shorter strip portions being joined and the opposed longer strip portions also being joined, the stack defining a first row of inlet apertures communicating with respective pockets of the first set, a second row of inlet apertures communicating with respective pockets of the second set, a first row of outlet apertures communicating with respective pockets of the second set, and a second row of outlet apertures communicating with respective pockets of the first set, said first rows being located respectively on adjacent sides of the first corner region of the stack and said second rows being located respectively on adjacent sides of the second corner region of the stack, baffles in each pocket guiding fluid flow therethrough along a serpentine path which includes at least two substantially parallel passes and extends from the inlet aperture of the pocket to the outlet aperture thereof, the parallel passes extending substantially parallel to the third and fourth opposite sides of the stack, and the parallel passes defined by the baffles in the pockets of the first set of pockets being in counterflow to the parallel passes defined by the baffles in the second set of pockets, first and second manifold means at the first and second corner regions respectively of the stack, the first manifold means comprising an inlet manifold opening into the apertures of the first row of inlet apertures and an outlet manifold for collecting fluid flowing from the apertures of the first set of outlet apertures, and the second manifold comprising an inlet manifold opening into the apertures of the second row of inlet apertures and an outlet manifold for collecting fluid flowing from the apertures of the second set of outlet apertures, and a blanking member closing each side of the stack.

2. A heat exchanger comprising a foil of thermally conductive material wound back and forth in sinuous fashion, the foil being composed of multiple length segments joined by return bends, the bends being substantially parallel to a predetermined axis, whereby a stack of foil length segments is formed, the return bends at opposite ends of a length segment being at opposite respective sides of the stack, each segment being composed of first, second and third length sections, the first and third length sections being at opposite respective ends of the segment and the second length section being between the first and third length sections and being connected to the first and third legnth sections by first and second baffle portions respectively, the first and third length sections of each length segment being substantially coplanar with each other and with the second length section of an adjacent segment, and each baffle portion being formed with an aperture, whereby a heat exchange pocket is defined between, on one side, the first and third length sections of one segment and the second length section of a second segment and, on the other side, the first and third length sections of said second segment, the apertures in the first and second baffle portions being spaced apart with respect to said predetermined axis, whereby fluid can flow through the pocket along a serpentine path which includes first, second and third substantially parallel passes.

3. A heat exchanger according to claim 2, wherein the stack of length segments defines first and second sets of pockets, each pocket of the first set being adjacent at least one pocket of the second set and each pocket of the second set being adjacent at least one pocket of the first set, and wherein the stack has first and second corner regions and the heat exchanger comprises first and second manifold means at the first and second corner regions respectively, the first manifold means comprising an inlet manifold opening into the pockets of the first set and an outlet manifold for collecting fluid flowing from the pockets of the second set, and the second manifold comprising an inlet manifold opening into the pockets of the second set and an outlet manifold for collecting fluid flowing from the pockets of the first set.

4. A heat exchanger according to claim 2, comprising blanking means closing the sides of the stack.

5. A heat exchanger according to claim 2, wherein the stack is generally rectangular and has first and second opposite sides and third and fourth opposite sides, and the heat exchanger comprises first, second, third and fourth blanking members closing the first, second, third and fourth sides respectively of the stack.

* * * * *